UNITED STATES PATENT OFFICE.

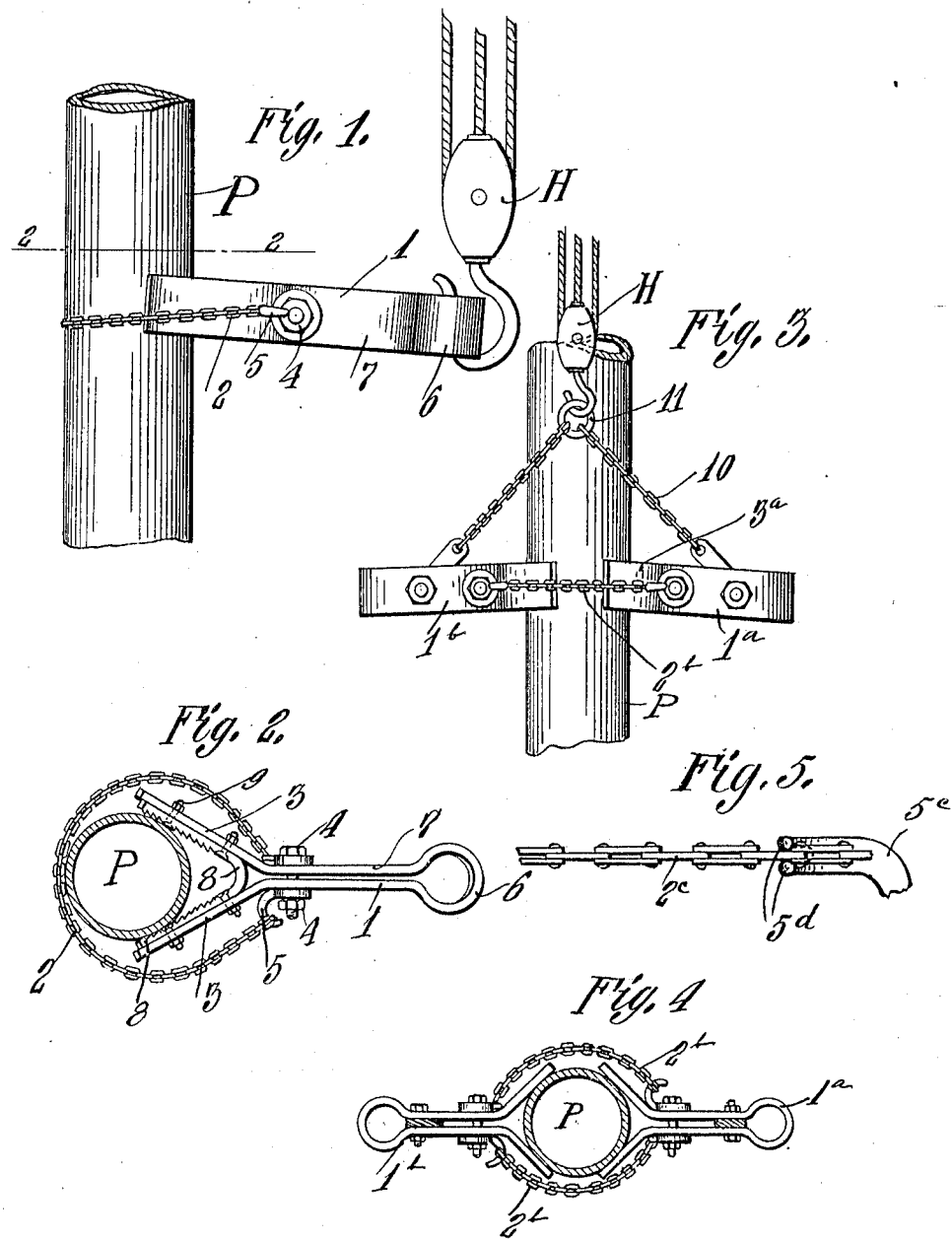

JOSEPH G. ROUNTREE, OF SAN ANTONIO, TEXAS.

PIPE-CLAMP.

953,234. Specification of Letters Patent. Patented Mar. 29, 1910.

Application filed March 12, 1909. Serial No. 483,089.

*To all whom it may concern:*

Be it known that I, JOSEPH G. ROUNTREE, a citizen of the United States, residing at San Antonio, in the county of Bexar and State of Texas, have invented certain new and useful Improvements in Pipe-Clamps, of which the following is a specification, reference being had to the accompanying drawings.

This invention relates to improvements in pipe and rod lifting clamps especially adapted for use in lifting pipes, drill rods and the like into and out of wells.

The object of the invention is to improve and simplify the construction of devices of this character and to provide one which will be simple, strong, durable and comparatively inexpensive and which may be quickly and easily adjusted for use upon pipes of various sizes.

With the above and other objects in view, the invention consists of the novel features of construction and the combination and arrangement of parts hereinafter fully described and claimed, and illustrated in the accompanying drawings, in which—

Figure 1 is a side elevation of the improved clamp showing the use of the same; Fig. 2 is a horizontal section taken on the plane indicated by the line 2—2 in Fig. 1; Figs. 3 and 4 are views similar to Figs. 1 and 2 showing a modified form of the invention; and Fig. 5 is a detail view showing a different form of chain and hook which may be substituted for the chain and hook shown in the other figures of the drawings.

Referring more particularly to Figs. 1 and 2 of the drawings, 1 and 2 denote the two co-acting members of the clamp, the former being in the form of a lever provided with a forked end to provide diverging jaws 3 and the latter being in the form of a flexible and adjustable element such as a chain adapted to extend around a pipe and to hold the same in engagement with the jaws 3. This flexible member or chain 2 may be of any form and construction and one end of it is preferably permanently attached to the intermediate portion of the lever or member 1 by arranging it upon a transverse bolt 4. The free end of said chain 2 is adjustably fastened by engaging any one of its links with a keeper projection or hook 5 formed preferably on one end of a plate which is secured to the lever 1 on its side opposite to that to which the other end of the chain is fastened and preferably by means of the bolt or transverse fastening 4, as clearly shown in Fig. 2 of the drawings. As shown more clearly in Fig. 2 said chain is fastened to the eye of a plate arranged beneath the head of the bolt 4. While the lever 1 may be of any suitable form and construction, it is preferably made from a single piece or strap of metal bent upon itself at its center to provide a loop or eye 6, straight parallel portions 7, which latter form a handle, and the diverging ends which form the jaws 3. The eye 6 is adapted to be engaged by the hook or other part of a suitable hoisting tackle, indicated at H in Fig. 1, whereby a pipe P or the like which is engaged by the clamp may be readily lifted into or out of a well.

By making the clamping member 2 from a chain or other flexible element it will adapt itself to the pipe or object engaged and by making it adjustable it will adapt itself to pipes or objects of different sizes.

If desired, the opposing inner faces of the jaws 3 may be provided with a roughened or serrated jaw facing 8 preferably in the form of an angular or V-shaped plate bolted or riveted, as at 9, to the jaws 3, as shown in Fig. 2. It will be understood, however, that the jaw facing 8 may be omitted if desired.

The modified form of the invention shown in Figs. 3 and 4 of the drawings is in the form of a double clamp but is quite similar to the embodiment just described. In this modification, instead of employing merely a single lever, two are provided and they are designated $1^a$ and $1^b$ and are arranged to oppose each other so that their forked ends or jaws $3^a$ will engage opposite sides of the pipe. Instead of employing merely one chain, two are used, the same being designated $2^a$ and $2^b$ and each having one end permanently attached to one lever and the other adjustably connected to the other lever in a manner similar to that in which the chain 2 in Fig. 2 is arranged and as will be readily understood upon reference to Fig. 4 of the drawings. The outer ends of the opposing levers $1^a$, $1^b$ have connected to them chains or links 10 provided with eyes 11 to receive the hook of the hoisting tackle, as shown in Fig. 3 of the drawings.

In using the invention, it will be understood that when it is desired to use the clamp upon a pipe, the lever is swung to an upwardly inclined position and its jaws engaged with the pipe, and the chain is then passed around the pipe and fastened to the keeper hook. When thus applied and the outer end of the lever is lifted, the jaws of said lever will swing downwardly to tightly bind the pipe in the chain, as clearly shown in Fig. 1 of the drawings. The use of the form of the invention shown in Figs. 3 and 4 is similar and will be readily understood upon reference to said figures.

In Fig. 5 of the drawings is shown a link chain 2ᶜ adapted to be engaged with a double or forked hook 5ᶜ having spaced prongs 5ᵈ. This style of chain and hook may be employed instead of the style shown in the other figures of the drawings.

Having thus described the invention what is claimed is:

1. A pipe clamp comprising a lever formed by bending a single metal strap upon itself to provide an eye, straight parallel portions projecting from the eye to form a handle, and outwardly diverging ends forming jaws, a transverse bolt arranged in the straight portions of the lever adjacent its jaws, an eye plate upon one of the projecting ends of said bolt, a hook plate upon the oppositely projecting end of said bolt, a rod or pipe engaging means including a chain or chains, one end of the latter being engaged with said eye plate, the other adjustably engaged with said hook plate.

2. A pipe clamp comprising a pair of opposing jaw levers, each formed from a single metal strap by bending the same at its center to provide an eye and straight parallel portions, the ends of the latter being bent angularly to provide diverging jaws, transverse bolts arranged in the parallel portions of the levers of said jaws, an eye plate upon one of the projecting ends of each of said bolts, a hook plate upon the other projecting end of each of said bolts, chains, each having one end engaged with one of the eye plates and its other end adjustably engaged with one of the hook plates, other transverse bolts passed through the parallel portions of the levers adjacent the eyes of the latter, suspending links arranged on the last mentioned bolts between said parallel portions of the levers, a ring and chains between the latter and said suspending links.

In testimony whereof I hereunto affix my signature in the presence of two witnesses.

JOSEPH G. ROUNTREE.

Witnesses:
 NORMAN A. NELSON,
 L. L. MUNSELL.